US010762422B2

(12) United States Patent
Shaked et al.

(10) Patent No.: US 10,762,422 B2
(45) Date of Patent: Sep. 1, 2020

(54) WIDE AND DEEP MACHINE LEARNING MODELS

(71) Applicant: Google LLC, Mountain View, CA (US)

(72) Inventors: Tal Shaked, Los Altos, CA (US); Rohan Anil, San Francisco, CA (US); Hrishikesh Balkrishna Aradhye, Mountain View, CA (US); Mustafa Ispir, Mountain View, CA (US); Glen Anderson, Palo Alto, CA (US); Wei Chai, Cupertino, CA (US); Mehmet Levent Koc, Mountain View, CA (US); Jeremiah Harmsen, San Jose, CA (US); Xiaobing Liu, Mountain View, CA (US); Gregory Sean Corrado, San Francisco, CA (US); Tushar Deepak Chandra, Los Altos, CA (US); Heng-Tze Cheng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 600 days.

(21) Appl. No.: 15/394,668

(22) Filed: Dec. 29, 2016

(65) Prior Publication Data
US 2017/0300814 A1    Oct. 19, 2017

Related U.S. Application Data

(60) Provisional application No. 62/322,161, filed on Apr. 13, 2016.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01); *G06N 3/0472* (2013.01); *G06N 3/084* (2013.01)

(58) Field of Classification Search
CPC ...... G06N 3/0454; G06N 3/0472; G06N 3/08; G06N 3/084
See application file for complete search history.

(56) References Cited

PUBLICATIONS

Li et al ("Deep Convolutional Neural Network and Multi-View Stacking Ensemble in Ali Mobile Recommendation Algorithm Competition", 2015 IEEE 15th International Conference on Data Mining Workshops, 2015, pp. 1055-1062) (Year: 2015).*

(Continued)

*Primary Examiner* — Kakali Chaki
*Assistant Examiner* — Robert Lewis Kulp
(74) *Attorney, Agent, or Firm* — Fish & Richardson P.C.

(57) ABSTRACT

A system includes one or more computers and one or more storage devices storing instructions that when executed by the one or more computers cause the computers to implement a combined machine learning model for processing an input including multiple features to generate a predicted output for the machine learning input. The combined model includes: a deep machine learning model configured to process the features to generate a deep model output; a wide machine learning model configured to process the features to generate a wide model output; and a combining layer configured to process the deep model output generated by the deep machine learning model and the wide model output generated by the wide machine learning model to generate the predicted output, in which the deep model and the wide model have been trained jointly on training data to generate the deep model output and the wide model output.

16 Claims, 3 Drawing Sheets

(56) References Cited

PUBLICATIONS

Zhang et al ("Co-saliency Detection by Looking Deep and Wide", 2015 IEEE Conference on Computer Vision and Pattern Recognition (CVPR), Boston, MA, 2015, pp. 2994-3002) (Year: 2015).*
Jayaraman et al. ("Decorrelating Semantic Visual Attributes by Resisting the Urge to Share", Proceedings of the IEEE Conference on Computer Vision and Pattern Recognition (CVPR), 2014, pp. 1-8) (Year: 2014).*
Lin et al. ("Network in Network", https://arxiv.org/abs/1312.4400, arXiv:1312.4400v3 [cs.NE] Mar. 4, 2014, pp. 1-10) (Year: 2014).*
Abdulnabi et al. ("Multi-task CNN Model for Attribute Prediction", https://arxiv.org/abs/1601.00400, arXiv:1601.00400v1 [cs.NE] Jan. 4, 2016, pp. 1-11) (Year: 2016).*
Chen et al ("Learning Deep Structured Models", Proceedings of the 32nd International Conference on Machine Learning, Lille, France, 2015, JMLR: W&CP vol. 37, 2015, pp. 1-10) (Year: 2015).*
Jei et al ("OM-2: An Online Multi-class Multi-kernel Learning Algorithm", 2010 IEEE Computer Society Conference on Computer Vision and Pattern Recognition—Workshops, San Francisco, CA, 2010, pp. 1-8) (Year: 2010).*
Matthew Zeiler ("Hierarchical Convolutional Deep Learning in Computer Vision", PHD Dissertation, Department of Computer Science, New York University, Jan. 2014, pp. 1-226) (Year: 2014).*
Santoni et al. ("Cattle Race Classification Using Gray Level Co-Occurrence Matrix Convolutional Neural Networks", Procedia Computer Science, Jul. 2015, pp. 493-502) (Year: 2015).*
International Search Report and Written Opinion in International Application No. PCT/US2016/068842, dated Mar. 20, 2017, 16 pages.
Pandey et al. "To go deep or wide in learning?," arXiv preprint arXiv:1402.5634v1, Feb. 23, 2014, 9 pages.
Shao et al. "Learning Deep and Wide: A Spectral Method for Learning Deep Networks," IEEE Transactions on Neural Networks and Learning Systems, IEEE, Piscataway, NK, vol. 25, No. 12, Dec. 1, 2014, 6 pages.
Yang et al. "Neural network ensembles: combining multiple models for enhances performance using a multistage approach," Expert Systems., Nol. 21, No. 5, Nov. 1, 2004, 10 pages.
Duchi et al. "Adaptive subgradient methods for online learning and stochastics optimization," Journal of Machine Learning Research vol. 12, Jul. 2011, 39 pages.
He et al. "Deep residual learning for image recognition," Proceedings of the IEEE Conference on Computer Vision and Pattern Recognition, 2016, 9 pages.
McMahan "Follow-the-regularized-leader and mirror descent: Equivalence theorems and II regularization," Proceedings of the $14^{th}$ International Conference on Artificial Intelligence and Statistics, 2011, 9 pages.
Mikolov et al. "Strategies for training large scale neural network language models," IEEE Workshop on Automatic Speech Recognition and Understanding, Dec. 11, 2011, 6 pages.
Rendle et al. "Factorization machines with libFM," ACM Transactions on Intelligent Systems and Technology, 3.3, May 1, 2012, 22 pages.
Tompson et al. "Joint training of a convolutional network and a graphical model for human pose estimation," Advances in neural information processing systems, 2014, 9 pages.
Wang et al. "Collaborative deep learning for recommender systems," arXiv preprint arXiv1409.2944v2, Jun. 18, 2015, 10 pages.
Yan et al. "Appjoy: Personalized mobile application discovery," Proceedings of the $9^{th}$ International Conference on Mobile Systems, Applications, and Services, Jun. 28, 2011, 14 pages.
Hirata, et.al, "A Novel Approach to Time Series Forecasting using Deep Learning and Linear Model," EEJ Transactions on Electronics, Information and Systems, the Institute of Electrical Engineers of Japan, Mar. 2016, 136(3): 348-356.
JP Notice of Reasons for Rejection in Japanese Appln. No. 2018-553922, dated Jan. 27, 2020, 5 pages (with English translation).
KR Office Action in Korean Appln. No. 10-2018-7028972, dated Jan. 20, 2020, 19 pages (with English translation).
EP Office Action in European Application No. 16826643, dated Apr. 8, 2020, 6 pages.
KR Office Action in Korean Application No. 10-2018-7028972, dated Jun. 23, 2020, 4 pages (with English translation).

* cited by examiner

WIDE AND DEEP MACHINE LEARNING MODELS

CROSS-REFERENCE TO RELATED APPLICATION

This application claims priority to U.S. Provisional Application Ser. No. 62/322,161, filed on Apr. 13, 2016. The disclosure of the prior application is considered part of and is incorporated by reference in the disclosure of this application.

BACKGROUND

This specification relates to processing inputs using a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network includes an output layer and one or more hidden layers that each apply a non-linear transformation to a received input to generate an output.

SUMMARY

This specification describes systems and methods for implementing a wide and deep machine learning model, i.e., a combined machine learning model that includes both a wide machine learning model and a deep machine learning model.

In general, one innovative aspect of the subject matter described in this specification can be embodied in a system that includes one or more computers and one or more storage devices storing instructions that when executed by the one or more computers cause the one or more computers to implement a combined machine learning model for processing a machine learning input including multiple features to generate a predicted output for the machine learning input. The combined machine learning model can include: a deep machine learning model configured to process the features to generate a deep model intermediate predicted output; a wide machine learning model configured to process the features to generate a wide model intermediate predicted output; and a combining layer configured to process the deep model intermediate predicted output generated by the deep machine learning model and the wide model intermediate predicted output generated by the wide machine learning model to generate the predicted output, in which the deep machine learning model and the wide machine learning model have been trained jointly on training data to generate the deep model intermediate predicted output and the wide model intermediate predicted output.

The foregoing and other embodiments can each optionally include one or more of the following features, alone or in combination. The features can be features of a content presentation setting, and wherein the predicted output is a predicted output for the content presentation setting. The features of the content presentation setting can include features of a content item to be presented in the content presentation setting, and wherein the predicted output for the content presentation setting represents a likelihood that a particular objective will be satisfied if the content item is presented in the content presentation setting. The combining layer can be a logistic regression layer that is configured to process the deep model intermediate predicted output generated by the deep machine learning model and the wide model intermediate predicted output generated by the wide machine learning model to generate a score that represents the likelihood that the particular objective will be satisfied if the content item is presented in the content presentation setting. The predicted output for the content presentation setting can be a respective score for each content item in a predetermined set of content items, and wherein each respective score represents a respective likelihood that a particular objective will be satisfied if the corresponding content item is presented in the content presentation setting. The combining layer can be a softmax layer that is configured to process the deep model intermediate predicted output generated by the deep machine learning model and the wide model intermediate predicted output generated by the wide machine learning model to generate the respective score for each content item in a predetermined set of content items. The features can include user features characterizing a user to whom a content item is to be presented in the content presentation setting. The features can include contextual information characterizing a context of the content presentation setting. The deep model can include a deep neural network. The deep model may include an embedding layer that is configured to map each of the features to a respective numeric embedding of the feature. The wide model can be a generalized linear model. The wide model may be configured to process the features and transformed features generated from the features to generate the wide model intermediate output. The wide model intermediate output and the deep model intermediate output can be log odds outputs.

In general, another innovative aspect of the subject matter described in this specification can be embodied in one or more computer storage media storing instructions that when executed by one or more computers cause the one or more computers to implement the combined machine learning model as described above.

Another innovative aspect of the subject matter described in this specification can be embodied in methods of training the combined machine learning model described above. The method can include the actions of obtaining training data including, for each of a plurality of training inputs, (i) features of the training input and (ii) a known output for the training input; and for each of the training inputs: processing the features of the training input using the deep machine learning model to generate a deep model intermediate predicted output for the training input in accordance with current values of parameters of the deep machine learning model; processing the features of the training input using the wide machine learning model to generate a wide model intermediate predicted output for the training input in accordance with current values of parameters of the wide machine learning model; processing the deep model intermediate predicted output and the wide model intermediate predicted output for the training input using the combining layer to generate a predicted output for the training input; backpropagating a gradient determined from an error between the predicted output for the training input and the known output for the training input through the combining layer to the wide machine learning model and the deep machine learning model to jointly adjust the current values of the parameters of the deep machine learning model and the wide machine learning model.

The foregoing and other embodiments can each optionally include one or more of the following features, alone or in combination. The methods can include the action of adjusting the current values of the parameters of the deep machine learning model and the wide machine learning model using mini-batch stochastic optimization. The method can include the action of adjusting the current values of the parameters of the wide machine learning model using a Follow-the-regularized-leader (FTRL) algorithm with L1 regularization. The method can include the action of adjusting the current values of the parameters of the deep machine learning model using stochastic gradient optimization with an adaptive learning rate.

Another innovative aspect of the subject matter described in this specification can be embodied in one or more computer storage media storing instructions that when executed by one or more computers cause the one or more computers to perform the operations of the method described above.

Another innovative aspect of the subject matter described in this specification can be embodied in one or more computers and one or more storage devices storing instructions that when executed by the one or more computers cause the one or more computers to perform the operations of the method described above.

Particular embodiments of the subject matter described in this specification can be implemented so as to realize one or more of the following advantages. In general, a wide machine learning model can memorize feature interactions through a wide set of cross-product feature transformations and a deep machine learning model can generalize unseen feature combinations by applying embedding functions to the input features. By including both deep machine learning model and wide machine learning model, the wide and deep machine learning model can obtain both benefits of memorization and generalization and thus can perform better on predicting an output from a set of input features.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAIL DESCRIPTION

Figure 1:
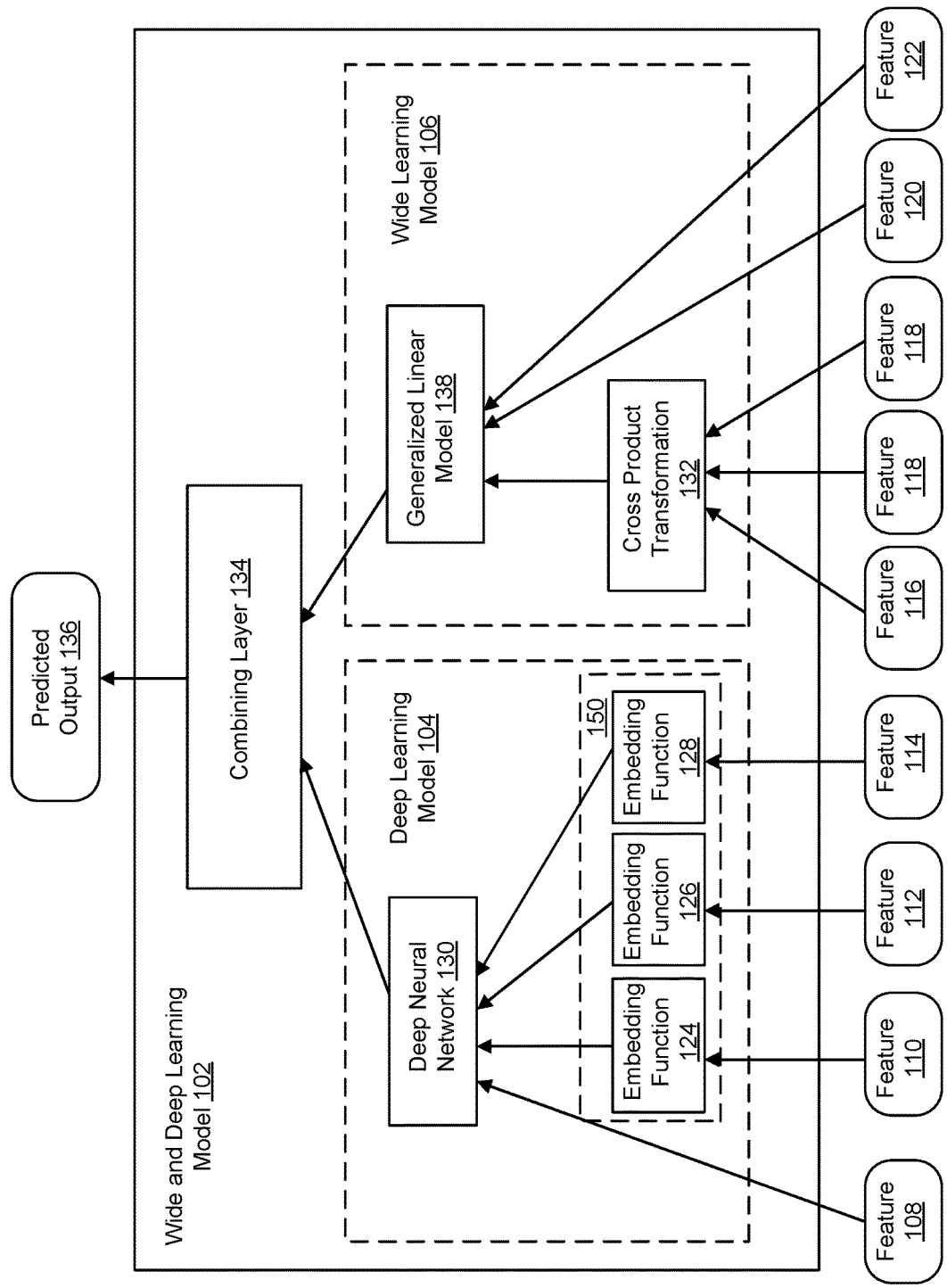
FIG. 1 is a block diagram of an example of a wide and deep machine learning model.

FIG. 1 is a block diagram of an example of a wide and deep machine learning model 102 that includes a deep machine learning model 104, a wide machine learning model 106, and a combining layer 134. The wide and deep machine learning model 102 receives a model input including multiple features, e.g. features 108-122, and processes the features to generate a predicted output, e.g., predicted output 136, for the model input.

As an example, the model input can be a sequence of words and the features 108-122 can include tokens representing the words in the sequence and other features characterizing the words in the sequence. In this example, the predicted output 136 may be, e.g., a likelihood that a particular word is the next word in the sequence or a prediction for a part of speech or a word sense for a particular word in the sequence.

In another example, the features 108-122 can include features of a content presentation setting and the predicted output 136 can be a predicted output for the content presentation setting.

In some cases, the features 108-122 can include features of a content item, and the predicted output 136 for the content presentation setting may be a score that represents a likelihood that a particular objective will be satisfied if the content item is presented in the content presentation setting.

In some cases, the features 108-122 can include user features characterizing a user to whom a content item is to be presented in the content presentation setting.

In some cases, the features can include contextual information characterizing a context of the content presentation setting.

In some these cases, the predicted output 136 for the content presentation setting is a respective score for each content item in a predetermined set of multiple content items, where each respective score represents a respective likelihood that the particular objective will be satisfied if the corresponding content item is presented in the content presentation setting.

For example, the content item presentation setting may be a response to a search query submitted by a user. For example, the search query may be a search query submitted to an Internet search engine and the content items may be Internet search results identifying Internet resources that are candidates for being included in the response to the search query or third party content items that are candidates for being displayed with the Internet search results in the response to the search query. As another example, the search query may be a search query submitted to an online app store and the content items may be app search results identifying apps available on the online app store that are candidates for being displayed in response to the search query.

As another example, the content item presentation setting may be a particular position in an Internet resource, e.g., a web page, and the content items may be third party content items that are candidates for being displayed in the particular position in the Internet resource.

As another example, the content item presentation setting may be a content recommendation setting, e.g., a setting in which a content item of a particular type is being presented to a user and recommendations of other content items of the particular type that may be of interest to the user may also be presented to the user.

In this example, the content items being scored by the combined model may be content items that are candidates for being recommended to the user. For example, a video may be presented to a user by an online video sharing service. Along with the presented video, thumbnails of other videos that may be of interest to the user may also be presented by the video sharing service to the user. As another example, a product page identifying a product for sale by an online marketplace may be presented to a user and the product page may also include links to product pages for other products that may be of interest to the user.

The particular objective may be any of a variety of objectives that relate to the result of presenting a given content item in the content presentation setting.

For example, the particular objective may be the user selecting the content item that is presented in the content presentation setting. In this case, the score for a given content item represents a likelihood that the user will click on or otherwise select the content item if it is presented in the content presentation setting.

As another example, the particular objective may be the user performing one or more specified actions, e.g., purchasing an item, after viewing the content item that is presented in the content presentation setting. In this case, the score for a given content item represents a likelihood that the user will perform one of the specified actions if the given content item is presented in the content presentation setting.

As another example, the particular objective may be to not adversely affect user engagement by displaying a content item in the content presentation setting. In this case, the score for a given content item represents a value of a user engagement metric or a change in the value of the user engagement metric if the given content item is presented in the content presentation setting. The user engagement metric may be any appropriate metric that measures engagement of the user with presented content items.

The deep machine learning model 104 is a deep model that includes an embedding layer 150 and a deep neural network 130. In some implementations, the embedding layer is included in the deep neural network 130. The embedding layer 150 includes a set of embedding functions, e.g., the embedding functions 124-128. The deep neural network 130 includes multiple layers of operations, with at least one of the layers applying a non-linear transformation to a received input to generate an output.

In particular, the deep machine learning model 104 is configured to process a first set of features included in the model input of the wide and deep learning model 102 to generate a deep model intermediate predicted output. For example, the deep machine learning model 104 is configured to process the first set of features 108-114. The embedding layer can apply embedding functions to one or more of the first set of features 108-114. For example, the embedding layer 150 applies embedding functions 124-128 to features 110-114. In some cases, the features that are processed by the embedding layer are sparse, categorical features such as user features (e.g., country, language, and demographics), contextual features (e.g., device, hour of the day, and day of the week), and impression features (e.g., app age, historical statistics of an app). Other features that are not processed by the embedding layer may include continuous features such as a number of installations of a software application. Each of the embedding functions 124-128 applies a transformation to each of the features 110-114 that maps each of the features 110-114 to a respective numeric embedding, e.g., a floating point vector presentation of the feature. The numeric embedding can include one or more floating point values or one or more quantized integer values whose encoding represents floating point values. Embedding functions will be described in more detail below with reference to FIG. 2.

The deep neural network 130 receives the numeric embeddings from the embedding layer and, optionally, other input features (e.g., feature 108) as an input. The deep neural network 130 includes multiple, e.g., three or more, layers of operations that each apply a non-linear transformation to the received input to generate a deep model intermediate predicted output. Thus, the deep neural network 130 applies multiple non-linear transformations to the numeric embeddings and the other input features to generate an alternative representation of the input, i.e., the deep model intermediate predicted output.

The wide machine learning model 106 is a wide and shallow model, e.g., a generalized linear model 138, that is configured to process a second set of features (e.g., features 116-122) included in the model input of the wide and deep learning model 102 and to generate a wide model intermediate predicted output. In some implementations, some of features in the second set of features may overlap some of the features in the first set of features. In some other implementations, the second set of features may be completely different from the first set of features.

In some implementations, the wide machine learning model 106 is configured to process both the original input features (e.g. features 120 and 122) in the second set of features and transformed features generated from the other features (e.g., features 116-118), e.g., using a cross-product feature transformation 132, to generate the wide model intermediate output. In some cases, the cross-product feature transformation 132 is applied to categorical features. For binary features, the cross-product transformation is 1 if the constituent features are all 1, and 0 otherwise. This transformation can capture the interactions between the binarized categorical features, and add nonlinearity to the generalized linear model.

Each value in each intermediate output can be, e.g., a log odds output, a probability value, or another kind of numeric value.

The combined machine learning model 102 also includes a combining layer 134 that is configured to process the deep model intermediate predicted output generated by the deep machine learning model 104 and the wide model intermediate predicted output generated by the wide machine learning model 106 to generate the predicted output 136. In implementations where the predicted output is a single score, the combining layer may be a logistic regression layer. In implementations where the predicted output includes multiple scores, the combining layer may be a softmax layer.

Figure 2:
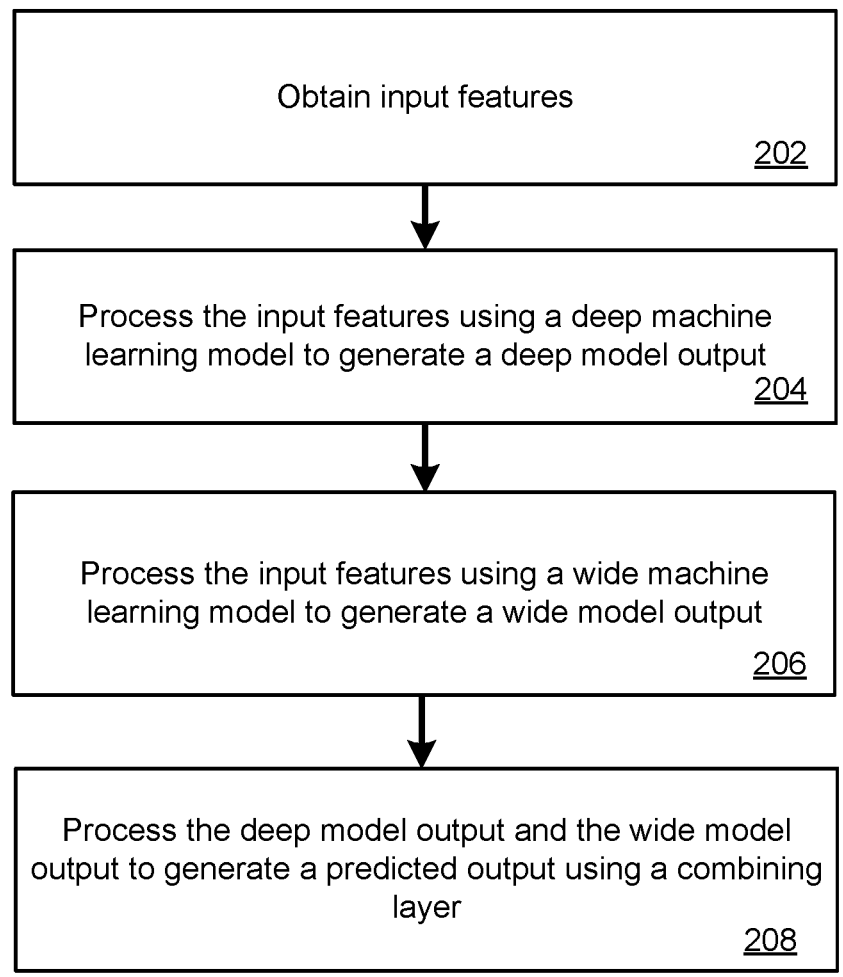
FIG. 2 is a flow diagram of an example process for generating a predicted input using a wide and deep learning model.

FIG. 2 is a flow diagram of an example process 200 for generating a predicted input using a wide and deep learning model. For convenience, the process 200 will be described as being performed by a system of one or more computers located in one or more locations.

The system obtains features of an input (step 202). As described above, each of the features may include one token or multiple tokens representing words in a sequence and other features characterizing the words in the sequence. Each of the features may be of a different type depending on the number of tokens included in each feature.

The system processes a first set of features from the obtained features using a deep machine learning model to generate a deep model intermediate predicted output (step 204). As described above, the deep machine learning model includes a deep neural network and an embedding layer that includes embedding functions. In some implementations, the system applies the embedding layer to a subset of the first set of features. In particular, the system uses each of the embedding functions for each of the feature type of the features in the subset to generate a numeric embedding, e.g., a floating-point vector representation, of the feature. Depending on the feature type and on the implementation, the embedding function for a given feature type can be any of a variety of embedding functions.

For example, for a feature type whose features consist of a single token, the embedding function may be a simple embedding function. A simple embedding function maps a single token to a floating point vector, i.e., a vector of floating point values. For example, the simple embedding function may map a token "cat" to a vector [0.1, 0.5, 0.2] and the word "iPod" to a vector [0.3, 0.9, 0.0], based on current parameter values, e.g., using a particular lookup table.

As another example, for a feature type whose features can potentially consist of a list of two or more tokens, the embedding function may be a parallel embedding function. A parallel embedding function maps each token in a list of tokens to a respective floating point vector and outputs a single vector that is the concatenation of the respective floating point vectors. For example, for an ordered list of tokens {"Atlanta", "Hotel"}, the parallel embedding function may map "Atlanta" to a vector [0.1, 0.2, 0.3] and "Hotel" to [0.4, 0.5, 0.6], and then output [0.1, 0.2, 0.3, 0.4, 0.5, 0.6]. In order to identify the respective floating point vectors, the parallel embedding function may use a single lookup table or multiple different look up tables.

As another example, for a feature type whose features can potentially consist of a list of two or more tokens, the embedding function may be a combining embedding function. A combining embedding function maps each token in the list to a respective floating point vector and then merges the respective floating point vectors into a single merged vector. The combining embedding function can merge the respective floating point vector using a linear function, e.g., a sum, average, or weighted linear combination of the respective floating point vectors, or using a nonlinear function, e.g., a component-wise maximum or a norm-constrained linear combination, for example. In order to identify the respective floating point vectors, the parallel embedding function may use a single look up table or multiple different look up tables. For example, for the ordered list {"Atlanta", "Hotel"}, the parallel embedding function may map "Atlanta" to a vector [0.1, 0.2, 0.3] and "Hotel" to [0.4, 0.5, 0.6], and then output the sum of the two vectors, i.e., [0.5, 0.7, 0.9].

As another example, for a feature type whose features can potentially consist of a list of two or more tokens, the embedding function may be a mixed embedding function. A mixed embedding function maps each token in a list of tokens to a respective floating point vector and generates an initial vector that is the concatenation of the respective floating point vectors. The mixed embedding function then merges the respective floating point vectors into a merged vector and concatenates the merged vector with the initial vector. For example, for the ordered list {"Atlanta", "Hotel"}, the mixed embedding function may output a concatenation of the vectors output by the parallel embedding function and the combining embedded function, i.e., [0.1, 0.2, 0.3, 0.4, 0.5, 0.6, 0.5, 0.7, 0.9].

Depending on the implementation, the system may utilize two different kinds of embedding functions for two different feature types, and the two embedding functions may or may not share parameters. For example, the system may utilize a combining embedding function for a first feature type and a mixed embedding function for a second feature type.

If one or more of the features are not discrete, prior to processing the feature using an embedding function, the system uses a hashing function to hash each non-discrete feature. The system can then partition each hashed feature into one of a pre-determined set of partitions, and process a value corresponding to the partition using the embedding function for the feature. Additionally, if a particular feature cannot be obtained, the system can map that feature to a pre-determined value.

In some implementations, instead of floating point values, a given embedding function may generate a different kind of numeric values. For example, the embedding function may generate quantized integer values whose encoding represents floating point values.

The system processes the numeric embeddings (e.g., floating-point vector representations) and, optionally, one or more of the original input features using a deep network network. The deep neural network can be, e.g., the deep neural network 130 of FIG. 1. The deep network includes multiple layers with at least one layer including a non-linear transformation. A non-linear transformation can be defined based on values of a respective set of parameters. For example, the deep network can include one or more hidden neural network layers and a sparse binary output layer, e.g., a layer that outputs a vector that is 0 or 1 at every position. In general, the deep network generates an alternative representation of the input as a deep model intermediate predicted output based on the floating-point vector representations of the subset of features and the remaining features in the first set of features.

The system processes a second set of features from the obtained features using a wide machine learning model to generate a wide model intermediate predicted output (step 206). In some implementations, the second set of features may overlap with the first set of features. In some other implementations, the second set of features may be different from the first set of features. The system can apply a cross-product feature transformation to a subset of the second set of features to generate transformed features. The system can then process both the original input features in the second set of features and the transformed features generated from the other features through the use of the cross-product feature transformation using the wide model to generate the wide model intermediate output. The wide model can be a generalized linear model having multiple parameters that define the original input features and transformed features. The system can apply the generalized linear model to the original input features and the transformed features to generate the wide model intermediate output.

The system processes the deep model output and the wide model output to generate a predicted output using a combining layer (step 208). Generally, the combining layer combines the deep model output and the wide model output, e.g., by computing a sum or a weighted sum of the two outputs, to generate a combined output and then generates the predicted output from the combined output. In implementations where the predicted output is a single score, the system can use a logistic regression layer as the combing layer to process the deep model output and the wide model output. In implementations where the predicted output includes multiple scores, the system can use a softmax layer as the combing layer to process the deep model output and the wide model output.

Figure 3:
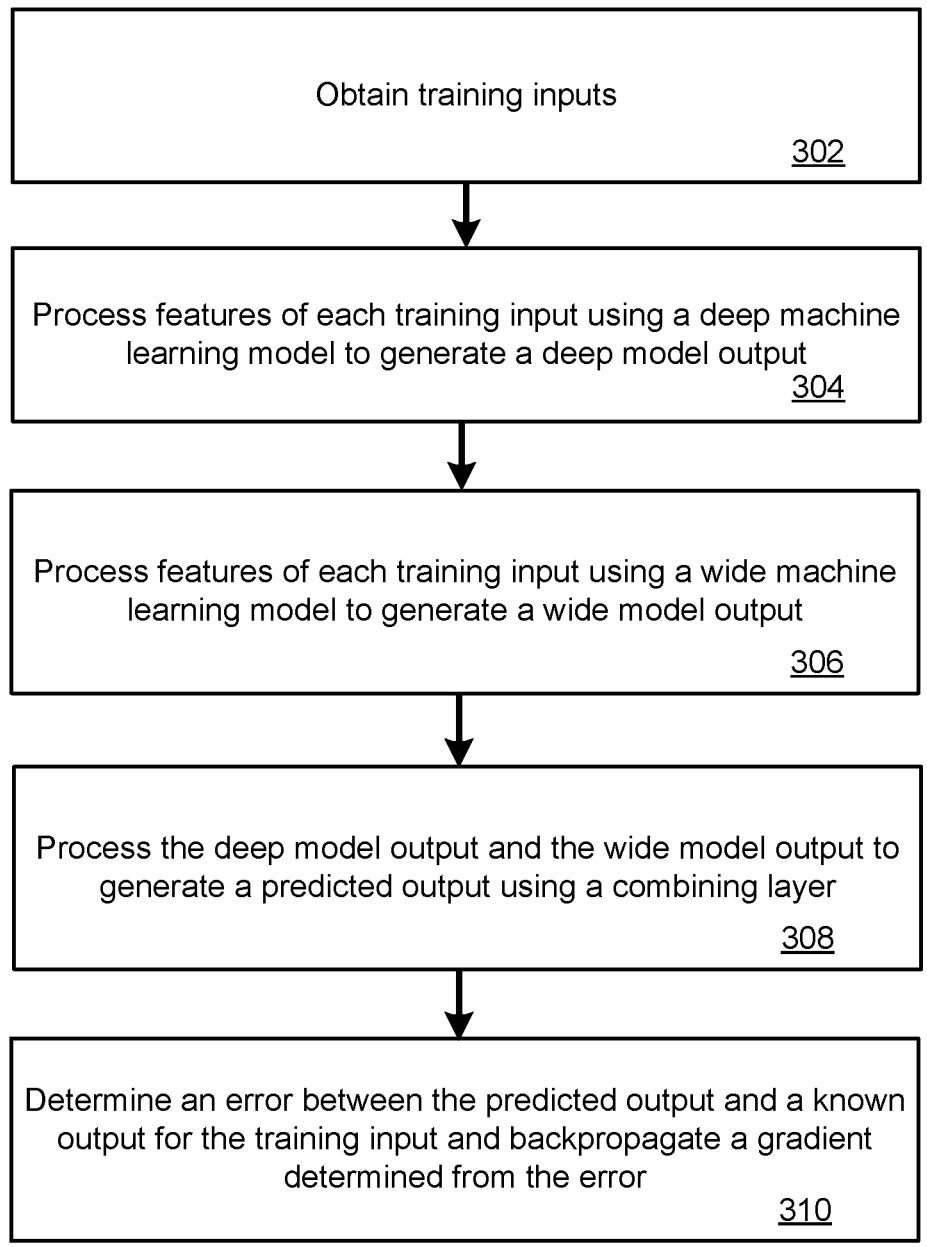
FIG. 3 is a flow diagram of an example process for training a machine learning system that includes a wide and deep learning model.

FIG. 3 is a flow diagram of an example process 300 for training a machine learning system that includes a wide and deep learning model. For convenience, the process 300 will be described as being performed by a system of one or more computers located in one or more locations.

To determine trained values of the parameters of the wide model and of the deep model, the system trains the combined model on training data.

In some implementations and as described in FIG. 3, the system trains the wide model and the deep model jointly.

The system obtains training data (step 302) that includes, for each of multiple training inputs, (i) features of the training input and (ii) a known output for the training input.

The system then trains the combined model by, for each of the training inputs, processing the features of the training input using the deep machine learning model to generate a deep model intermediate predicted output for the training input in accordance with current values of parameters of the deep machine learning model (step 304).

The system processes the features of the training input using the wide machine learning model to generate a wide model intermediate predicted output for the training input in accordance with current values of parameters of the wide machine learning model (step 306).

The system then processes the deep model intermediate predicted output and the wide model intermediate predicted output for the training input using the combining layer to generate a predicted output for the training input (step 308).

The system then determines an error between the predicted output for the training input and the known output for the training input. In addition, the system backpropagates a gradient determined from the error through the combining layer to the wide machine learning model and the deep machine learning model to jointly adjust the current values of the parameters of the deep machine learning model and the wide machine learning model in a direction that reduces the error (step 310). Furthermore, through the method of backpropagation, the system can send an error signal to the deep learning model, which allows the deep learning model to adjust the parameters of its internal components, e.g., the deep neural network and the set of embedding functions, though successive stages of backpropagation. The system can also send an error signal to the wide learning model to allow the wide learning model to adjust the parameters of the generalized linear model.

Generally, in these implementations, the system trains the deep machine learning model and the wide machine learning model using mini-batch stochastic optimization. For example, the system can train the wide machine learning model using a Follow-the-regularized-leader (FTRL) algorithm with L1 regularization and train the deep machine learning model on the second training data using stochastic gradient optimization with an adaptive learning rate.

In some other implementations, the system first trains the wide model on one set of training data separately from the combined model and then trains the deep model on the same or possibly different training data as part of the combined model.

That is, the system first trains the wide model on the training data without considering intermediate outputs generated by the deep model.

In these other implementations, after training the wide model and for each training input in the training data being used to train the deep model, the system processes the features of the training input using the deep machine learning model to generate a deep model intermediate predicted output for the training input in accordance with current values of parameters of the deep machine learning model, processes the features of the training input using the wide machine learning model to generate a wide model intermediate predicted output for the training input in accordance with trained values of parameters of the wide machine learning model, and processes the deep model intermediate predicted output and the wide model intermediate predicted output for the training input using the combining layer to generate a predicted output for the training input. The system then backpropagates a gradient determined from the error between the predicted output for the training input and the known output for the training input through the combining layer to the deep machine learning model to adjust the current values of the parameters of the deep machine learning model, i.e., while keeping the trained values of the parameters of the wide model fixed.

In yet other implementations, the system first trains the deep model on one set of training data separately from the combined model and then trains the wide model on the same or possibly different training data as part of the combined model.

That is, the system first trains the deep model on the training data without considering intermediate outputs generated by the wide model.

In these other implementations, after training the deep model and for each training input in the training data being used to train the deep model, the system processes the features of the training input using the wide machine learning model to generate a wide model intermediate predicted output for the training input in accordance with current values of parameters of the wide machine learning model, processes the features of the training input using the deep machine learning model to generate a deep model intermediate predicted output for the training input in accordance with trained values of parameters of the deep machine learning model, and processes the wide model intermediate predicted output and the deep model intermediate predicted output for the training input using the combining layer to generate a predicted output for the training input. The system then backpropagates a gradient determined from the error between the predicted output for the training input and the known output for the training input through the combining layer to the wide machine learning model to adjust the current values of the parameters of the wide machine learning model, i.e., while keeping the trained values of the parameters of the deep model fixed.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to implement a combined machine learning model for processing a machine learning input comprising a plurality of input features to generate a predicted output for the machine learning input, the plurality of input features comprising features of a content recommendation setting and the predicted output comprising a respective score for each of one or more content items, wherein each respective score represents a respective likelihood that a particular objective will be satisfied if the corresponding content item is presented in the content recommendation setting, the combined machine learning model comprising:
    a deep machine learning model configured to process a first subset of the plurality of input features that comprises features of the content recommendation setting to generate a deep model intermediate predicted output;
    a wide machine learning model configured to (i) apply cross-product transformation to at least some of the input features in a second subset of the plurality of input features that comprises features of the content recommendation setting to generate transformed features and (ii) to process, using a generalized linear model, the transformed features and the input features in the second subset to generate a wide model intermediate predicted output; and
    a combining layer configured to process the deep model intermediate predicted output generated by the deep machine learning model and the wide model intermediate predicted output generated by the wide machine learning model to generate the predicted output that comprises a respective score for each content item in the one or more content items,
    wherein the deep machine learning model and the wide machine learning model have been trained jointly on training data to generate the deep model intermediate predicted output and the wide model intermediate predicted output.

2. The system of claim 1, wherein the features of the content presentation setting include features of a particular content item to be presented in the content recommendation setting, and wherein the predicted output for the content recommendation setting represents a likelihood that a particular objective will be satisfied if the particular content item is presented in the content recommendation setting.

3. The system of claim 2, wherein the combining layer is a logistic regression layer that is configured to process the deep model intermediate predicted output generated by the deep machine learning model and the wide model intermediate predicted output generated by the wide machine learning model to generate a score that represents the likelihood that the particular objective will be satisfied if the particular content item is presented in the content recommendation setting.

4. The system of claim 1, wherein the combining layer is a softmax layer that is configured to process the deep model intermediate predicted output generated by the deep machine learning model and the wide model intermediate predicted output generated by the wide machine learning model to generate the respective score for each content item in the one or more content items.

5. The system of claim 1, wherein the plurality of input features include user features characterizing a user to whom a content item is to be presented in the content recommendation setting.

6. The system of claim 1, wherein the plurality of input features include contextual information characterizing a context of the content recommendation setting.

7. The system of claim 1, wherein the deep model includes a deep neural network.

8. The system of claim 7, wherein the deep model includes an embedding layer that is configured to map each of the features to a respective numeric embedding of the feature.

9. The system of claim 1, wherein the wide model intermediate output and the deep model intermediate output are log odds outputs.

10. A method of training a combined machine learning model, the combined machine learning model being configured to process a machine learning input to generate an output for the machine learning input, the combine machine learning model including a deep machine learning model, a wide machine learning model, and a combining layer that is configured to process outputs of the deep machine learning model and the wide machine learning model to generate the predicted output for the machine learning input, and the method comprising:
    obtaining training data comprising, for each of a plurality of training inputs, (i) features of the training input that comprise features of a content recommendation setting, and (ii) a known output for the training input; and
    for each of the training inputs:
        processing a first subset of the features of the training input using the deep machine learning model to generate a deep model intermediate predicted output for the training input in accordance with current values of parameters of the deep machine learning model;
        processing a second subset of the features of the training input using the wide machine learning model to generate a wide model intermediate predicted output for the training input in accordance with current values of parameters of the wide machine learning model, wherein processing the second subset of the features of the training input comprises:

applying cross-product transformation to at least some of the features of the training input in a second subset to generate transformed features, and processing, using a generalized linear model of the wide machine learning model, the transformed features and the features in the second subset to generate a wide model intermediate predicted output;

processing the deep model intermediate predicted output and the wide model intermediate predicted output for the training input using the combining layer to generate a predicted output for the training input, wherein the predicted output comprises a respective score for each content item in one or more content items and wherein each respective score represents a respective likelihood that a particular objective will be satisfied if the corresponding content item is presented in the content recommendation setting;

backpropagating a gradient determined from an error between the predicted output for the training input and the known output for the training input through the combining layer to the wide machine learning model and the deep machine learning model to jointly adjust the current values of the parameters of the deep machine learning model and the wide machine learning model.

11. The method of claim 10, further comprising adjusting the current values of the parameters of the deep machine learning model and the wide machine learning model using mini-batch stochastic optimization.

12. The method of claim 10, further comprising adjusting the current values of the parameters of the wide machine learning model using a Follow-the-regularized-leader (FTRL) algorithm with L1 regularization.

13. The method of claim 10, further comprising adjusting the current values of the parameters of the deep machine learning model using stochastic gradient optimization with an adaptive learning rate.

14. A non-transitory computer-readable medium having instructions stored thereon which, when executed by at least one computer, cause the at least one computer to perform operations to train a combined machine learning model, the combined machine learning model being configured to process a machine learning input to generate an output for the machine learning input, the combine machine learning model including a deep machine learning model, a wide machine learning model, and a combining layer that is configured to process outputs of the deep machine learning model and the wide machine learning model to generate the output for the machine learning input, and the operations comprising:

obtaining training data comprising, for each of a plurality of training inputs, (i) features of the training input that comprise features of a content recommendation setting, and (ii) a known output for the training input; and for each of the training inputs:

processing a first subset of the features of the training input using the deep machine learning model to generate a deep model intermediate predicted output for the training input in accordance with current values of parameters of the deep machine learning model;

processing a second subset of the features of the training input using the wide machine learning model to generate a wide model intermediate predicted output for the training input in accordance with current values of parameters of the wide machine learning model, wherein processing the second subset of the features of the training input comprises:

applying cross-product transformation to at least some of the features of the training input in a second subset to generate transformed features, and processing, using a generalized linear model of the wide machine learning model, the transformed features and the features in the second subset to generate a wide model intermediate predicted output;

processing the deep model intermediate predicted output and the wide model intermediate predicted output for the training input using the combining layer to generate a predicted output for the training input, wherein the predicted output comprises a respective score for each content item in one or more content items and wherein each respective score represents a respective likelihood that a particular objective will be satisfied if the corresponding content item is presented in the content recommendation setting;

backpropagating a gradient determined from an error between the predicted output for the training input and the known output for the training input through the combining layer to the wide machine learning model and the deep machine learning model to jointly adjust the current values of the parameters of the deep machine learning model and the wide machine learning model.

15. The non-transitory computer readable medium of claim 14, wherein the operations further comprise adjusting the current values of the parameters of the wide machine learning model using a Follow-the-regularized-leader (FTRL) algorithm with L1 regularization.

16. The non-transitory computer readable medium of claim 14, wherein the operations further comprise adjusting the current values of the parameters of the deep machine learning model using stochastic gradient optimization with an adaptive learning rate.

* * * * *